US009406090B1

(12) United States Patent
Adam et al.

(10) Patent No.: US 9,406,090 B1
(45) Date of Patent: Aug. 2, 2016

(54) CONTENT SHARING SYSTEM

(75) Inventors: Hartwig Adam, Marina Del Rey, CA (US); Hartmut Neven, Malibu, CA (US); Laura Garcia-Barrio, Brooklyn, NY (US); David Petrou, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 1161 days.

(21) Appl. No.: 13/346,564

(22) Filed: Jan. 9, 2012

(51) Int. Cl.
G06F 15/16 (2006.01)
G06Q 50/00 (2012.01)
G06F 17/27 (2006.01)
G06F 17/30 (2006.01)
G06F 17/21 (2006.01)

(52) U.S. Cl.
CPC ............... *G06Q 50/01* (2013.01); *G06F 17/21* (2013.01); *G06F 17/27* (2013.01); *G06F 17/30* (2013.01); *G06F 17/30634* (2013.01); *G06F 17/30699* (2013.01)

(58) Field of Classification Search
CPC ......... G06Q 50/01; G06F 17/21; G06F 17/27; G06F 17/30699; G06F 17/30634; G06F 17/30
USPC ........................................................ 709/217
See application file for complete search history.

(56) References Cited

U.S. PATENT DOCUMENTS

| | | | |
|---|---|---|---|
| 6,377,793 B1 | 4/2002 | Jenkins | |
| 6,480,713 B2 | 11/2002 | Jenkins | |
| 6,681,107 B2 | 1/2004 | Jenkins | |
| 6,690,516 B2 | 2/2004 | Aritake et al. | |
| 7,363,024 B2 | 4/2008 | Jenkins | |
| 8,179,434 B2 | 5/2012 | Koval et al. | |
| 8,332,424 B2 | 12/2012 | Flynn et al. | |
| 8,484,223 B2 | 7/2013 | Ota | |
| 8,649,776 B2 | 2/2014 | Tofighbakhsh et al. | |
| 2003/0020812 A1 | 1/2003 | Gutta et al. | |
| 2005/0083413 A1 | 4/2005 | Reed et al. | |
| 2005/0128072 A1 | 6/2005 | Li | |
| 2005/0162523 A1 | 7/2005 | Darrell et al. | |
| 2006/0264209 A1 | 11/2006 | Atkinson et al. | |
| 2007/0088488 A1 | 4/2007 | Reeves et al. | |
| 2007/0096909 A1 | 5/2007 | Lally | |
| 2007/0236575 A1* | 10/2007 | Jokinen ............. H04M 1/72522 348/207.99 |
| 2007/0250901 A1 | 10/2007 | McIntire et al. | |

(Continued)

OTHER PUBLICATIONS

U.S. Appl. No. 13/344,299, filed Jan. 5, 2012, Anguelov et al.
Nagao, Katashi, et al, "Ubiquitous Talker: Spoken Language Interaction with Real World Objects," Technical Report SCSL-TR-95-003, Sony Computer Science Laboratory Inc., Tokyo, Japan, 1995, 11 pages.

(Continued)

*Primary Examiner* — Joseph Greene
(74) *Attorney, Agent, or Firm* — Blakely Sokoloff Taylor & Zafman LLP

(57) ABSTRACT

A method and apparatus for sharing captured media data via a social networking service is described herein. The method includes receiving a list of one or more media data files captured via a mobile (i.e., portable) computing device, the list to include, for each of the media data files, data identifying one or more real-world experiences of a user of the social networking service associated with the respective media data file. The method also includes transmitting information for providing an interface to the mobile computing device to enable the user to share one or more of the media data files in the social network with one or more other users by identifying each media data file with the data identifying a corresponding real-world experience. Furthermore, the method allows for the sharing of data related to the context of each corresponding real-world experience.

25 Claims, 11 Drawing Sheets

(56) References Cited

U.S. PATENT DOCUMENTS

| | | |
|---|---|---|
| 2008/0043108 A1 | 2/2008 | Jung et al. |
| 2008/0140444 A1 | 6/2008 | Karkanias et al. |
| 2008/0167004 A1 | 7/2008 | Jenkins |
| 2008/0285940 A1 | 11/2008 | Kulas |
| 2009/0003662 A1 | 1/2009 | Joseph et al. |
| 2009/0006937 A1 | 1/2009 | Knapp et al. |
| 2009/0049004 A1 | 2/2009 | Nurminen et al. |
| 2009/0089352 A1 | 4/2009 | Davis et al. |
| 2009/0094520 A1 | 4/2009 | Kulas |
| 2009/0100050 A1 | 4/2009 | Erol et al. |
| 2009/0102859 A1 | 4/2009 | Athsani et al. |
| 2009/0165140 A1 | 6/2009 | Robinson et al. |
| 2009/0182644 A1 | 7/2009 | Panagopulos et al. |
| 2010/0046842 A1 | 2/2010 | Conwell |
| 2010/0103075 A1 | 4/2010 | Kalaboukis et al. |
| 2010/0318507 A1 | 12/2010 | Grant et al. |
| 2011/0025842 A1 | 2/2011 | King et al. |
| 2011/0069179 A1 | 3/2011 | Bathiche et al. |
| 2011/0072015 A1* | 3/2011 | Lin et al. ............... 707/737 |
| 2011/0135144 A1 | 6/2011 | Franklin, Jr. et al. |
| 2011/0143811 A1 | 6/2011 | Rodriguez |
| 2011/0145214 A1 | 6/2011 | Zhang et al. |
| 2011/0212717 A1 | 9/2011 | Rhoads et al. |
| 2011/0213664 A1 | 9/2011 | Osterhout et al. |
| 2011/0255738 A1 | 10/2011 | Gao et al. |
| 2011/0256886 A1 | 10/2011 | Velusamy |
| 2012/0004036 A1 | 1/2012 | Hill |
| 2012/0045093 A1* | 2/2012 | Salminen et al. ........ 382/103 |
| 2012/0159326 A1 | 6/2012 | Mital et al. |
| 2012/0233000 A1 | 9/2012 | Fisher et al. |
| 2012/0320013 A1 | 12/2012 | Perez et al. |
| 2013/0036134 A1 | 2/2013 | Neven et al. |
| 2013/0096731 A1 | 4/2013 | Tamari et al. |
| 2013/0110802 A1* | 5/2013 | Shenoy et al. ........... 707/706 |
| 2013/0169626 A1 | 7/2013 | Balan et al. |
| 2014/0073291 A1 | 3/2014 | Hildner et al. |

OTHER PUBLICATIONS

Rekimoto, Jun, "Augmented Interaction: The World Through the Computer," <http://ftp.csl.sony.co.jp/person/rekimoto/navi.html>, 1995, 2 pages.

Rekimoto, Jun, "Augmented Interaction: Toward a New Human-Computer Interaction Style Based on Situation Awareness," Interactive Systems and Software II (WISS'94 Proceedings), 1994 (in Japanese), 10 pages.

Rekimoto, Jun, "The Magnifying Glass Approach to Augmented Reality Systems," International Conference on Artificial Reality and Tele-Existence 1995 / Conference on Virtual Reality Software and Technology (ICAT/VRST 1995), 10 pages.

Rekimoto, Jun, et al, "The World through the Computer: Computer Augmented Interaction with Real World Environments," User Interface Software and Technology (UIST 1995), 8 pages.

Sung, Dan, "Augmented reality in action—social networking," <http://m.pocket-lint.com/news/news.phtml/38918>, Mar. 4, 2011, 7 pages.

Screen Capture of a YouTube Video, "N'importe Comment—The Toxic Avenger Feat Orelsan," <http://www.youtube.com/watch?v=XAOwo6uuhok>, accessed May 10, 2011, 1 page.

Wikipedia, "Lifelog," <http://en.wikipedia.org/wiki/lifelog>, Last Modified Apr. 3, 2011, 3 pages.

Girardin, Fabien, et al., "Uncovering the presence and movements of tourists from user-generated content," Oct. 17, 2008, 11 pages.

PCT/US2012/047537; PCT International Search Report and Written Opinion, mailed Dec. 26, 2012, 10 pages.

PCT/US2012/047537; PCT International Preliminary Report on Patentability, mailed Feb. 13, 2014, 8 pages.

Petrou, David et al. "Method and Apparatus for Enabling Event-Based Media Data Capture," U.S. Appl. No. 13/346,529, filed Jan. 9, 2012, whole document.

* cited by examiner

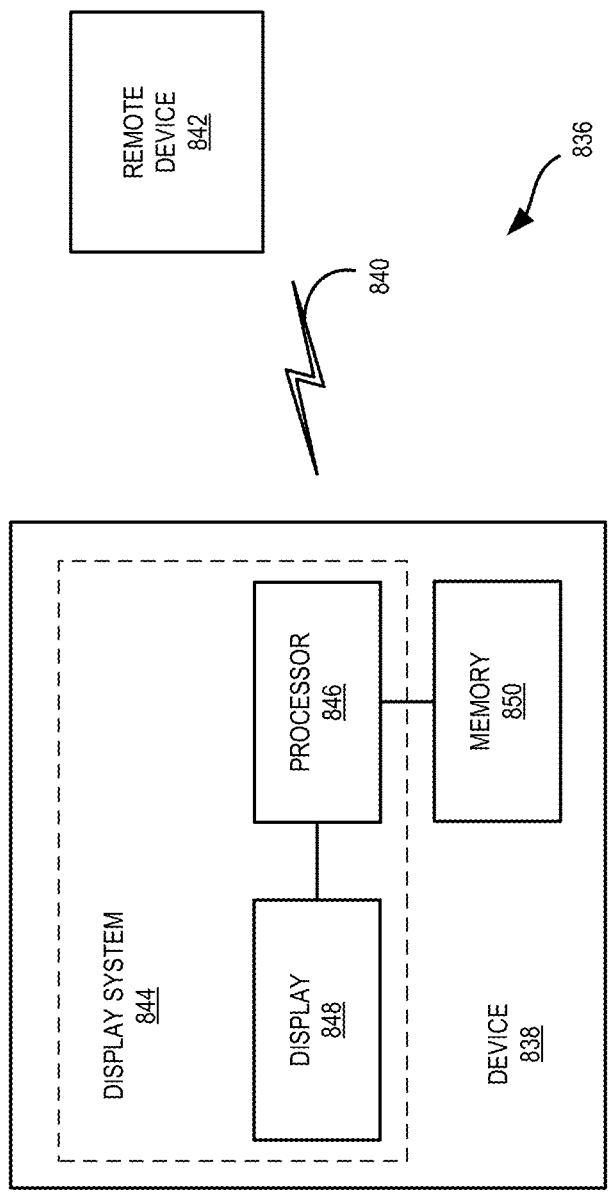

CONTENT SHARING SYSTEM

TECHNICAL FIELD

Embodiments of the invention relate to the field of social networks, and more particularly, to enabling a history of real-world user experiences to be shared via a social network.

BACKGROUND

Social networking services allow users to share messages and media data with members of their social network. For example, a user may post a message to reflect a thought, a mood, an event, or to share information such as a link, document, media file, or resource with other members. When a user wishes to post a message related to a recent experience, activity, event, or the like, there currently exists no interface to present the user with media data relevant to the user's message without also presenting media data that has little or no relevance to user's experience, activity, event, etc. Furthermore, the user is limited in terms of what information he is able to share; while a user may capture, for example, image data related to an experience, the image data alone does not convey other contextual data related to the experience. Thus, there exists a need for a solution to enable social network users to quickly and efficiently share user-generated content relevant to their real world experiences—i.e., presenting social network users with media data that captures their experiences, organized and ordered by the context of each experience, as well as data related to the context of each experience.

SUMMARY

A method and apparatus for sharing captured media data via a social networking service is described herein. The method includes receiving a list of one or more media data files captured via a mobile (i.e., portable) computing device, the list to include, for each of the media data files, data identifying one or more real-world experiences of a user of the social networking service associated with the respective media data file, the social networking service to track and enable connections between various users. The method also includes transmitting information for providing an interface to the mobile computing device to enable the user to share one or more of the media data files in the social network with one or more other users of the social network, the interface to identify each media data file with the data identifying a corresponding real-world experience. Furthermore, the method allows for the sharing of data related to the context of each corresponding real-world experience.

These and other aspects and embodiments are described in detail in the drawings, the description, and the claims.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

FIG. 8 illustrates an example computer network infrastructure for transmitting information for providing a social media client interface according to an embodiment of the invention.

DETAILED DESCRIPTION

Embodiments of an apparatus, system and method for sharing media data based on one or more real-world user experiences through a social networking service are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
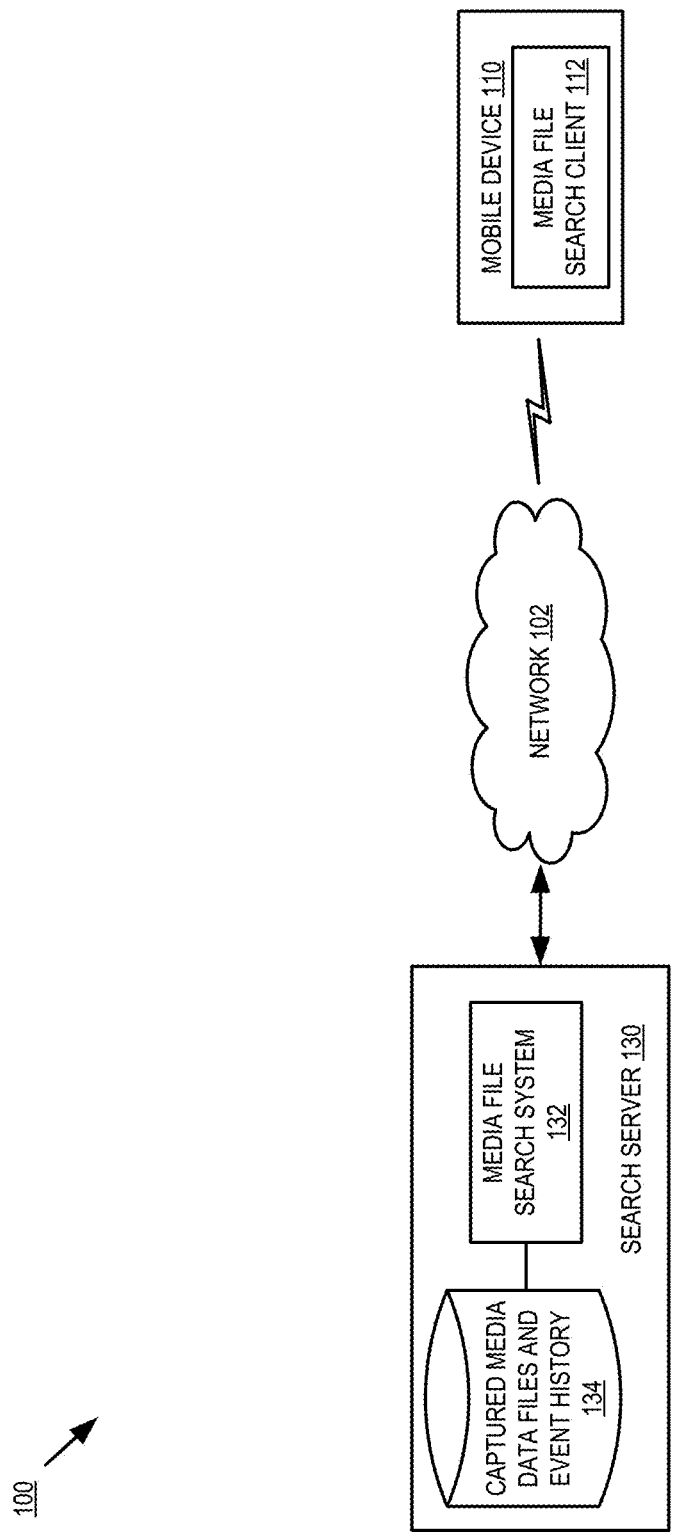
FIG. 1 is a block diagram of a system architecture including a server device to receive captured media data from a client device according to an embodiment of the invention.

FIG. 1 is a block diagram of a system architecture including a server device to receive captured media data from a client device according to an embodiment of the invention. System 100 includes mobile device 110 and search server 130. Mobile device 110 may be a mobile (i.e., portable) computing device, such as a mobile telephone, personal digital assistant, tablet computer, wearable computing device, etc. Search server 130 may also be a computing device, such as one or more server computers, desktop computers, etc.

Mobile device 110 and search server 130 may be communicatively coupled via network 102 using any of the standard network protocols for the exchange of information. In one embodiment, mobile device 110 is coupled with network 102 via a wireless connection, such as a cellular telephone connection, wireless fidelity connection, etc. Mobile device 110 and search server 130 may run on one Local Area Network (LAN) and may be incorporated into the same physical or logical system, or different physical or logical systems. Alternatively, mobile device 110 and search server 130 may reside on different LANs, wide area networks, cellular telephone networks, etc. that may be coupled together via the Internet but separated by firewalls, routers, and/or other network devices. It should be noted that various other network configurations can be used including, for example, hosted configurations, distributed configurations, centralized configurations, etc.

In this embodiment, mobile device 110 is able to capture digital image data with a digital camera (not shown) and capture audio data with a microphone (not shown) included in the mobile device. The captured digital image data may include still digital photographs, a series of digital photographs, recorded digital video, a live video feed, etc.

Digital image data may capture people, as well as real-world objects such as places or things, while digital audio data may capture music, conversations that convey data such as names, places, and news events, etc. When mobile device 110 captures media data, such as digital image data and/or digital audio data, audio/visual based search client 112 transmits the captured media data to search server 130. In one embodiment, audio/visual based search client 112 also transmits sensor data, such as location data and time data along with the captured media data, which corresponds to the location and time when the media data was captured. Audio/visual based search system 132 of search server 130 receives the media and sensor data, and performs one or more recognition processes on the media data, as discussed below.

In one embodiment, when audio/visual based search system 132 of search server 130 receives media data from audio/visual based search client 112, it performs one or more image recognition processes on digital image data and/or performs one or more audio recognition processes on the digital audio data. For example, audio/visual based search system 132 may perform a facial recognition process on people within the digital image data or an image matching process on objects within the digital image data. Audio/visual based search system 132 may also (or alternatively) perform an audio recognition process on the audio data to determine whether a recorded or live song is playing, determine what words are being spoken, etc.

In one embodiment, when audio/visual based search system 132 identifies a specific person, a specific object (e.g., artwork, architecture, monuments, retail locations, etc.), a specific song, words indicative of location, words indicative of a person in simultaneously captured digital image, etc., it stores data indicative of the match in audio/visual based search history 134. The stored match is a record of a user experience in the real world. For example, when a person is matched within digital image data, audio/visual based search system 132 may store the event that caused the digital image data to be captured, the person's identity, the location where the digital image was captured, and the time the digital image was captured in a database record or searchable index within audio/visual based search history 134. Furthermore, the entry in audio/visual based search history 134 is stored along with the user identification data, such as user account, a unique ID, etc.

Said recognition processes are performed on any additional media data received from mobile device 110, and matches are stored in audio/visual based search history 134. Since the audio and/or video data matches are stored in association with data identifying a user of mobile device 110, a history of user experiences in the real world captured by mobile device 110 is stored at audio/visual based search history 134. Said history of real-world user experiences is searchable, as discussed below.

In one embodiment, mobile device 110 is also responsible for receiving user queries to search audio/visual based search history 134 (other computing devices, such as a personal computer, laptop, tablet computer, smartphone, etc., may receive and transmit queries against a history of user experiences, as discussed below). The query may be a text based query entered into a user interface of audio/visual based search client 112, and transmitted by mobile device 110 to search server 130. The query may also be a spoken or audio query received by audio/visual based search client 112 via a microphone (not shown) of mobile device 110, and transmitted to search server 130. When the query is a spoken or audio query, audio/visual based search client 112 may either transmit the audio to search server 130, or mobile device 110 may parse the query to locate keywords which are then transmitted as a text-based query to search server 130.

Audio/visual based search system 132 may receive the user query from audio/visual based search client 112. As discussed above, when a query is a spoken or audio query that has not been parsed (i.e., the query is audio data), audio/visual based search system 132 parses the query to locate keywords, as discussed above. Audio/visual based search system 132 performs the search against the audio/visual based search history 134 for items relevant to the query and which are related to the user identification data associated with a user of mobile device 110. Audio/visual based search system 132 transmits results of the search to the mobile device for audio/visual based search client 112 to display to a user.

In one embodiment, the history of user experiences stored at audio/visual based search history 134 enable queries to be executed on a user's history of real-world experiences, such as "What was the playlist of songs at the party last night?," "What were the paintings I saw when I was on vacation in Paris?," "Who were the people at the business lunch this afternoon?," "How many books did I read in May?," etc. The queries enable a user to search and locate the people, places, and things that he or she has experienced.

Queries may be issued for histories across multiple users. For example, friends on a social networking website may specify that their user experience histories on audio/visual based search history 134 are available for searches by friends, the public, members of user groups, etc. Thus, a user might be able to enter queries such as "Where were my friends last night?", "What did John see on vacation?", etc.; however, a user of a social networking website may wish to publish specific user experiences (i.e., one or a subset of experiences available from audio/visual based search history 134). Thus, embodiments of the invention enable a social networking website to submit a type of query to search server 130 as described below.

In yet another embodiment, queries may be issued for histories that have been generated by multiple users. A group of users may be generating histories for a common purpose. For example, a group of security guards, airport screeners, etc. may generate histories while they are working. Then at a later point in time, a query such as "Show me the faces of all people that were seen between 1 P.M. and 3 P.M." may be entered by any member of the group, a supervisor in charge of the group, etc.

Figure 2:
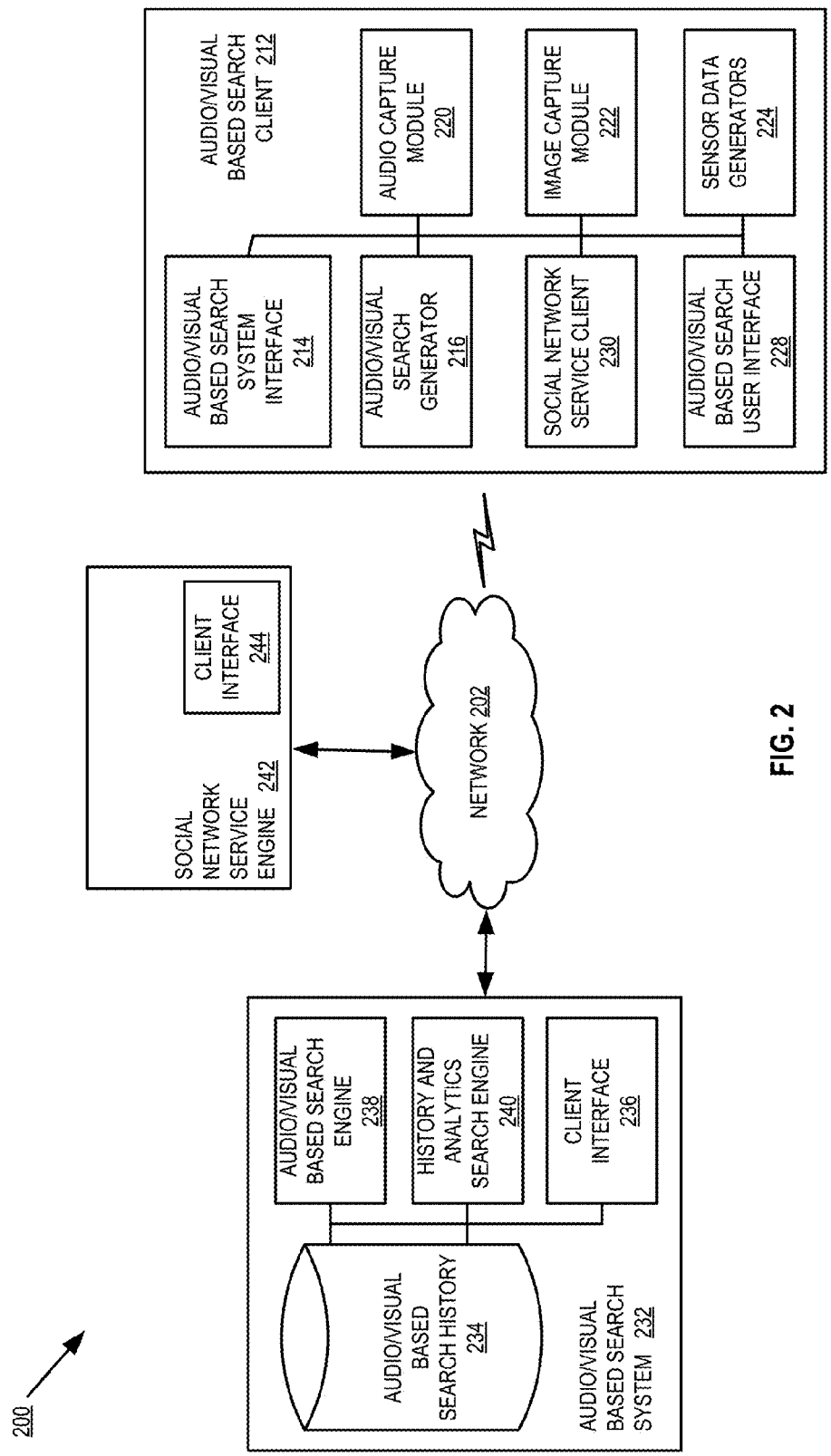
FIG. 2 is a block diagram of a system including a social network service engine communicatively coupled to an audio/visual based search server and client according to an embodiment of the invention.

FIG. 2 is a block diagram of a system including a social network service engine communicatively coupled to an audio/visual based search server and client according to an embodiment of the invention. Audio/visual based search client 212 and audio/visual based search system 232 of system 200 provide additional details for audio/visual based search client 112 and audio/visual based search system 132 discussed above in FIG. 1.

In this embodiment, audio/visual based search client 212 includes audio capture module 220, image capture module 222, sensor data generators 224, audio/visual search generator 216, audio/visual based search system interface 214, social network service client 230, and audio visual based search user interface 228. Audio/visual based search system 232 includes client interface 236, history and analytics search engine 240, audio/visual based search engine 238, and audio/visual based search history 234. Social network service engine 242 includes client interface 244; while shown separately, it is to be understood that in other embodiments, social network service engine may be included in the same device or system as audio/visual based search system 232. In this embodiment, social network service engine 242, audio/visual based search client 212 and audio/visual based search system 232 communicate with each other over various networks 202 and network configurations as discussed above in FIG. 1.

In audio/visual based search client 212, a user may capture media data utilizing one or both of audio capture module 220 and image capture module 220 in order to generate a history of user experiences, as discussed herein. A user may specify that image data and/or audio data are transferred to audio/visual based search system 232 when captured by a user initiated event, such as a user taking a picture, speaking into a microphone, pressing a button on audio/visual based search user interface 228 indicating that user wishes to add media data to audio/visual based search history 234, etc. In one embodiment, a user is able to set location based preferences where audio/visual based search client 212 is to capture media data. For example, when a mobile device is in Mountain View, Calif., audio/visual based search client 212 may be set to continuously, or at regular periodic intervals, capture media data without a user initiating the media capture. In another example, a user's current location determines if they are in a popular location (e.g., one in which a certain number of other users have captured media data for experience histories). When the user is determined to be within a popular location, preference manager may automatically turn on media capture without intervention of a user. Audio capture module 220 and/or image capture module 222 may be set to continuously or periodically capture media data for a specific interval of time. For example, media may be continuously captured for two hours after a specific event (e.g., after arriving at a specific location, in response to a user command, etc.). A user may further set media capture to always on, so that audio capture module 220 and image capture module 222 are continuously capturing media data without a user initiating the media capture. In one embodiment, the settings for media data capture may change between the modes discussed above based on current conditions of a battery of a mobile device. Preferences settings may be received, changed, updated, etc. via a user interface provided by audio/visual based search user interface 228.

In response to the capture of media data, audio/visual search generator 216 prepares the captured media data for transmission to audio/visual based search system 232. In one embodiment, audio/visual search generator 216 generates digital signatures for objects within image data captured by image capture module 222, selects audio samples or generates digital signatures from audio data captured by audio capture module 220, and obtains data from sensor data generators 224, such as location data, time data, acceleration data, etc. In another embodiment, audio/visual search generator 216 does not generate image signatures or locate audio samples. Audio/visual search generator 216 combines the media data with the sensor data, which are then transmitted by audio/visual based search system interface to client interface 236 of audio/visual based search system 232.

When audio/visual based search engine 238 receives digital image data and/or audio data, audio/visual based search engine 238 generates digital signatures for objects within the received image data and selects audio samples from the received audio data. However, as discussed above, audio/visual based search engine 238 may also receive image signatures and audio samples, and thus does not generate the signatures and samples. In one embodiment, audio/visual based search engine 238 utilizes the digital image signatures and/or audio samples to perform one or more recognition processes on the media data to attempt to determine specific objects, people, things, etc. within digital image data, or determine words, a song title, people's names, etc., within audio data. For example, audio/visual based search engine 238 may utilize the image signatures and/or audio samples to search visual and audio search servers, databases, indexes, etc. (not shown). When audio/visual based search engine 238 finds a match, indicating that an object within image data or a sound within audio data has been recognized, audio/visual based search engine 238 stores the results in audio/visual based search history 234. In one embodiment, audio/visual based search engine 238 also stores user identification data and relevant sensor data along with the match results. As discussed above, as more matches are found for media data captured by the user, a history of user experiences is created by audio/visual based search system 232.

In this embodiment, a user is enabled to search an associated history of user experiences by generating search queries via audio/visual based search user interface 228. Audio/visual based search user interface 228 may receive queries in the form of text inputted by the user. Audio/visual based search user interface 228 may also receives queries in the form of audio input received by audio capture module. For example, voice command based searching is received by audio/visual based search user interface 228 in the form of spoken word; audio/visual based search user interface 228 parses the voice command based search to locate keywords. Based on the keywords, audio/visual based search user interface 228 generates a keyword based search query. Regardless of the way a query is generated, audio/visual based search system interface 214 transmits the query to client interface 236.

In one embodiment, history and analytics search engine 240 receives the search query from client interface 236. History and analytics search engine 240 then performs the search on audio/visual based search history 234 associated with the user who generated the search. Because the audio/visual based search history stores a history of user experiences, history and analytics search engine 240 executes searches such as "How many books did I read last month?," "Who was at the club this weekend?," "What buildings did I see in Sydney, Australia?," etc. History and analytics search engine 240 receives results of the search, and client interface 236 transmits the results to audio/visual based search client 212, which are displayed to a user via audio/visual based search user interface 228.

Social network service engine 242 provides a social networking service to the user of audio/visual based search client 212. Said social networking service provides the user with means for distributing content to other users of the service (e.g., friends, family, acquaintances, etc.). Said content may be messages, pictures, videos, audio data, and the like.

Client interface 244 included in social networking service engine 242 is communicatively coupled to both client interface 236 of audio/visual based search system 232 and social network service client 230 of audio/visual based search client 212 to enable the user to share media data files related to their history of real-world experiences within the social network. Said history presented within social network service client 230 may be reduced (i.e., filtered) based on various social networking contexts as described below.

Figure 3:
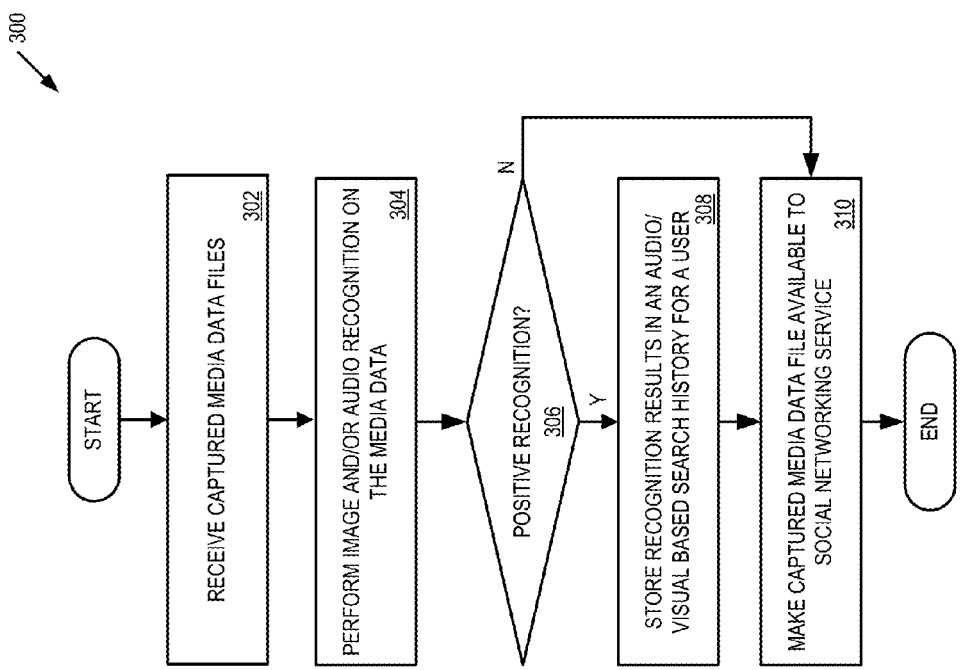
FIG. 3 is a flow diagram of a process for presenting captured media data files to a client device according to an embodiment of the invention.

FIG. 3 is a flow diagram of a process for presenting captured media data files to a client device according to an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Method 300 is performed by processing logic that may comprise hardware (circuitry, dedicated logic, etc.), software (such as is run on a general purpose computer system or a dedicated machine), firmware, or a combination. In one embodiment, method 300 is performed by an audio/visual based search system (e.g., audio/visual based search client 132 or 232) and a social networking service provider (e.g., social networking service engine 242).

Processing logic begins by receiving captured media data files from a client device (processing block 302), such as the digital image data and/or digital audio data. Processing logic performs image and/or audio recognition on the received media data (processing block 304). For example, processing logic may perform an image recognition process on received video or image data to search for real world objects, people, or other known objects and perform an audio recognition process on received video or audio data to search for known audio, such as songs, voice recognition, keywords etc.

Processing logic then determines whether a person, object, or sound has been recognized (processing block 306). When a match is found, and thus a person, object, or sound within the media data has been identified, processing logic stores the results in an audio/visual based search history for a user (processing block 308). The social networking service is then notified that media data related to a history of real-world experiences is available to potentially be shared via the social networking service (processing block 310). In some embodiments, in the event no person, object, or sound has been recognized in processing block 306, the media file is associated with known data (e.g., location or time data) by default in order to store the file in the audio/visual based search history for the user; in other embodiments, in the event no person, object, or sound has been recognized in processing block 306, the social networking service is notified of the existence of the media file, but it is not automatically associated with an identifiable real-world experience, and the user is prompted to enter data to describe the media file in order to store the file in the audio/visual based search history for the user.

Figure 4:
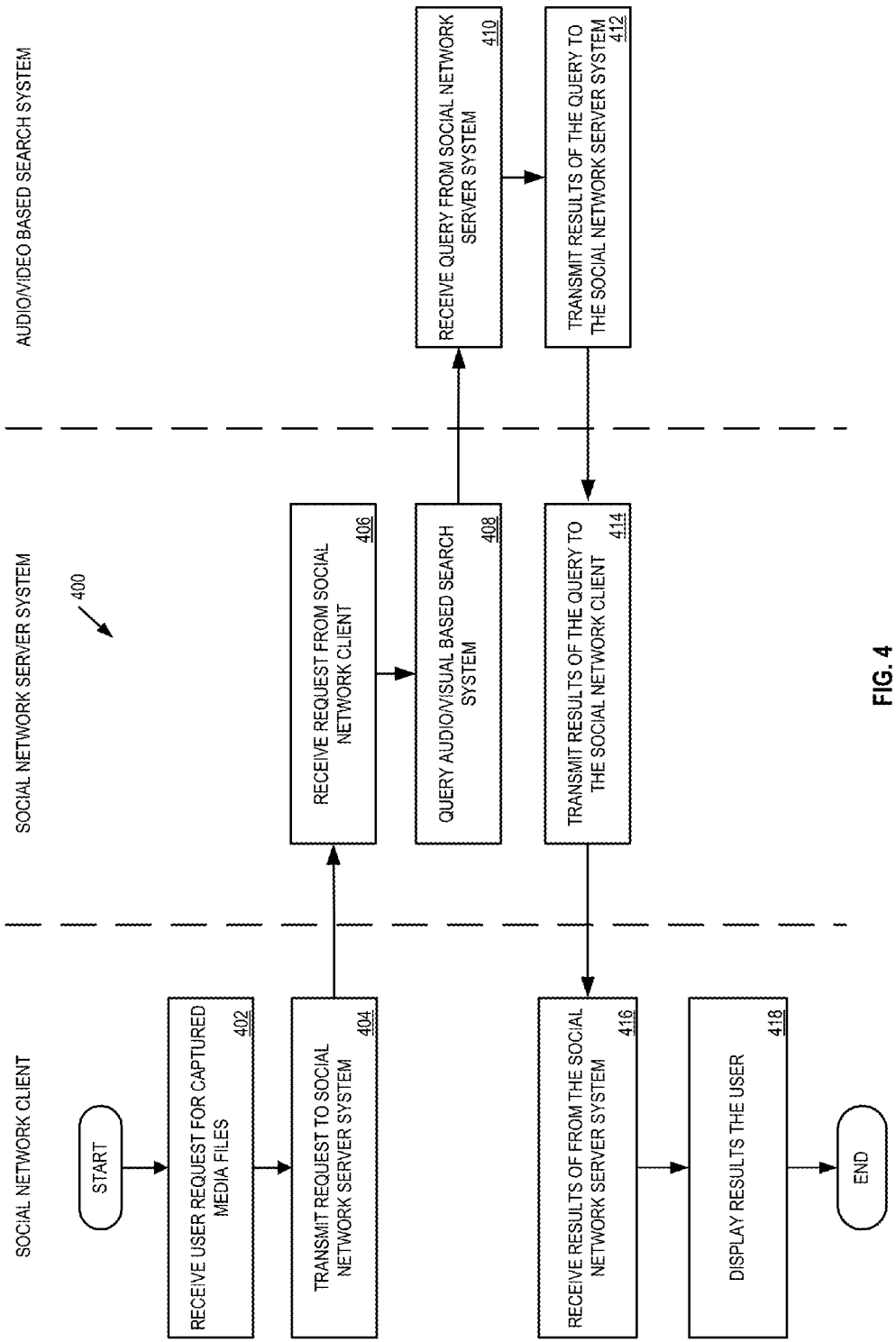
FIG. 4 is a flow diagram of a process to search and identify captured media data from a history of user experiences within a social networking context according to an embodiment of the invention.

FIG. 4 is a flow diagram of a process to search and identify captured media data from a history of user experiences within a social networking context according to an embodiment of the invention. Process 400 begins by receiving a user search for media data (processing block 402) within a social networking context. The user may specifically request media data, or the social networking client interface may interpret user actions as a request for media data, as described below. Thus, request for media data is transmitted to the social network server system (processing block 404).

When the social network server system receives the request for media data in the context of the current use of the social networking service (processing block 406), the request is converted into a query for an audio/video based search system (processing block 408) for the system to execute on a history of the user's real-world experiences, which have been captured and recorded in an audio/visual based search history. For example, a user's interaction with the social networking service may be related to an event (e.g., a party, a holiday, etc.) and this interaction is interpreted as a search for media data related to the event. In another example, the user may be currently located in an identifiable location, and this is interpreted as a search for media data captured at this location. In another embodiment, the user is simply presented with a list of media capture events; the user selects one of the events, which is interpreted as a search for captured media data related to that event.

Processing logic then transmits the search to an audio/visual based search system. The search is received from the audio visual based search client (processing block 410) and processing logic queries an audio/visual based search history based on the received search. Processing logic transmits results of the query to the social networking service (processing block 412), which in turn transmits the results to the social network client interface (processing block 414).

The social network client interface receives the results of the query from the audio/visual based search system (processing block 416) and displays the results of the query to the user within the social network client interface (processing block 418). In one embodiment, the results of the query display data indicative of the media data in the user's history of real world experiences. For example, query results that include digital images or video data may include the display of thumbnail images indicative of the image data or a sample of video data within the social network client interface. As another example, query results that include audio data may include the display of album artwork that corresponds to matched songs in the history of user experiences. In one embodiment, said social network client interface comprises a graphical user interface presented to the user, and this interface is to further display the query results. For example, the results display may be displayed on a map indicating the locations where matches relevant to the query have occurred, along a timeline illustrating the relationship between when matches relevant to the query have occurred, displayed in a slider that enables a user to browse a plurality of different matches relevant to the query, etc. Thus, embodiments of the invention present users with a collection of media data related to their recent experiences, organized or ordered by different criteria (e.g., chronologically, by location, by type), enabling users to quickly and efficiently select what result they want to share through the social network.

Figure 5A:
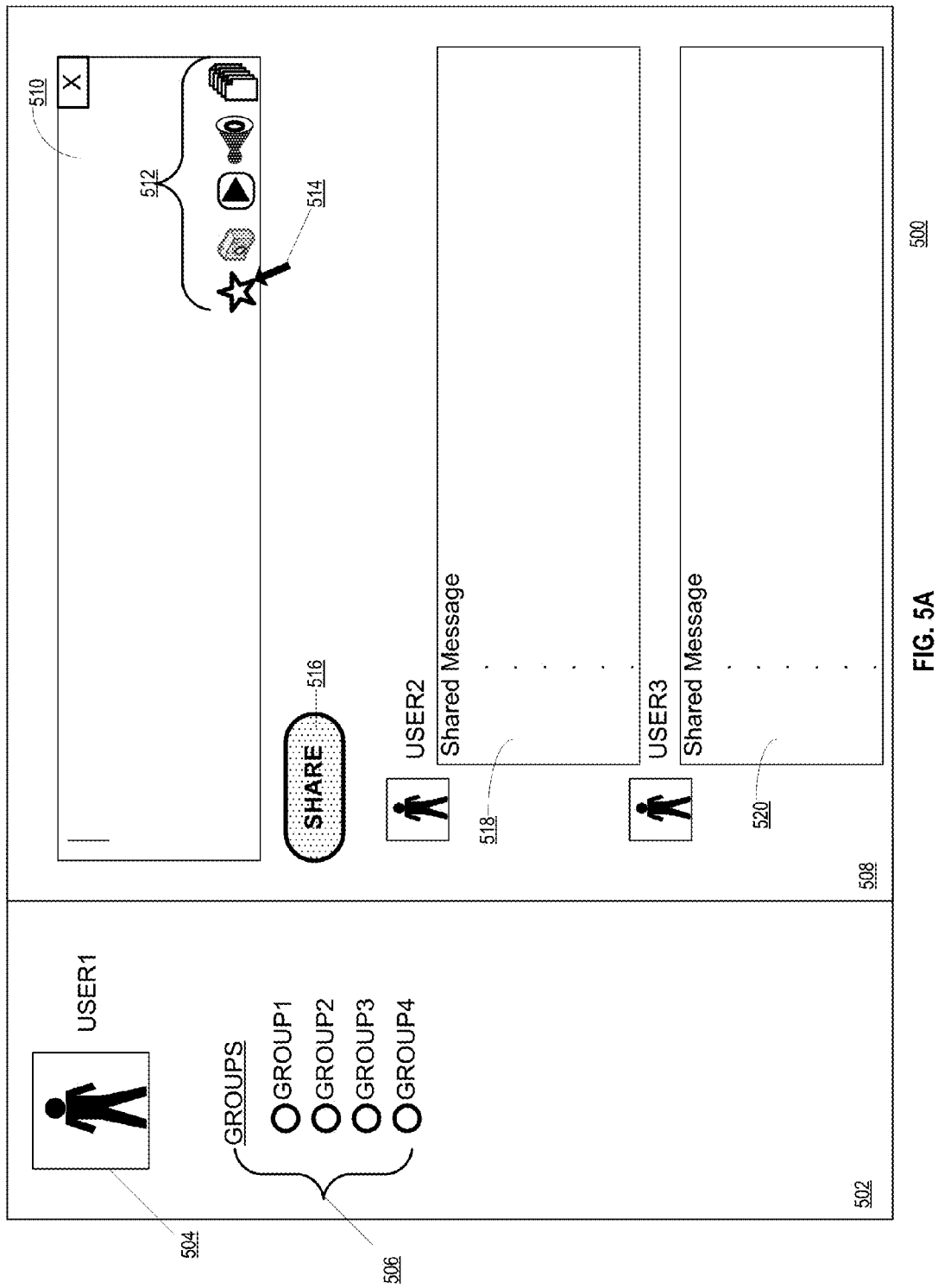
FIG. 5A-5C illustrate a client interface to a social networking service enabled to access captured media data according to an embodiment of the invention.
Figure 5B:
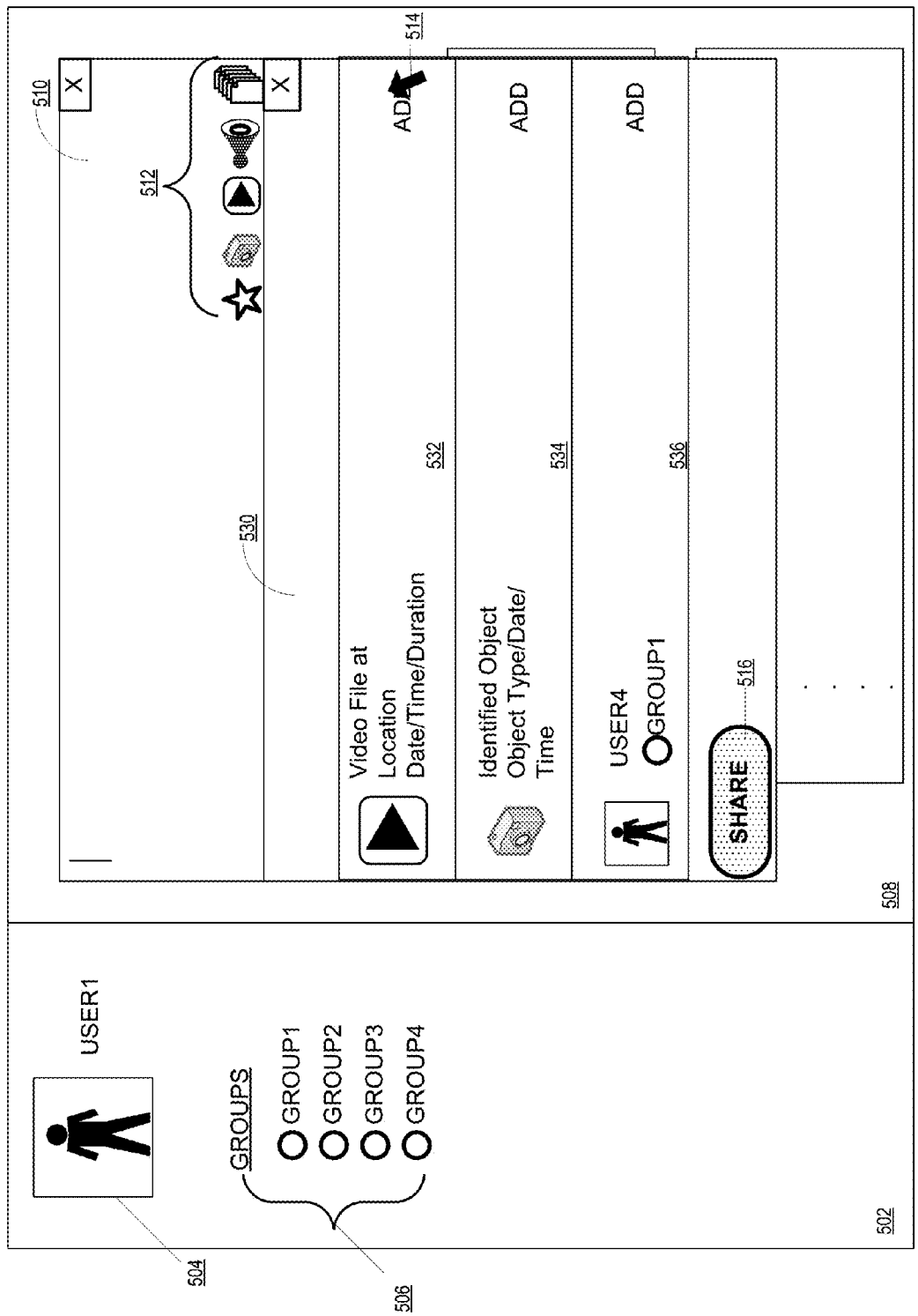
Figure 5C:
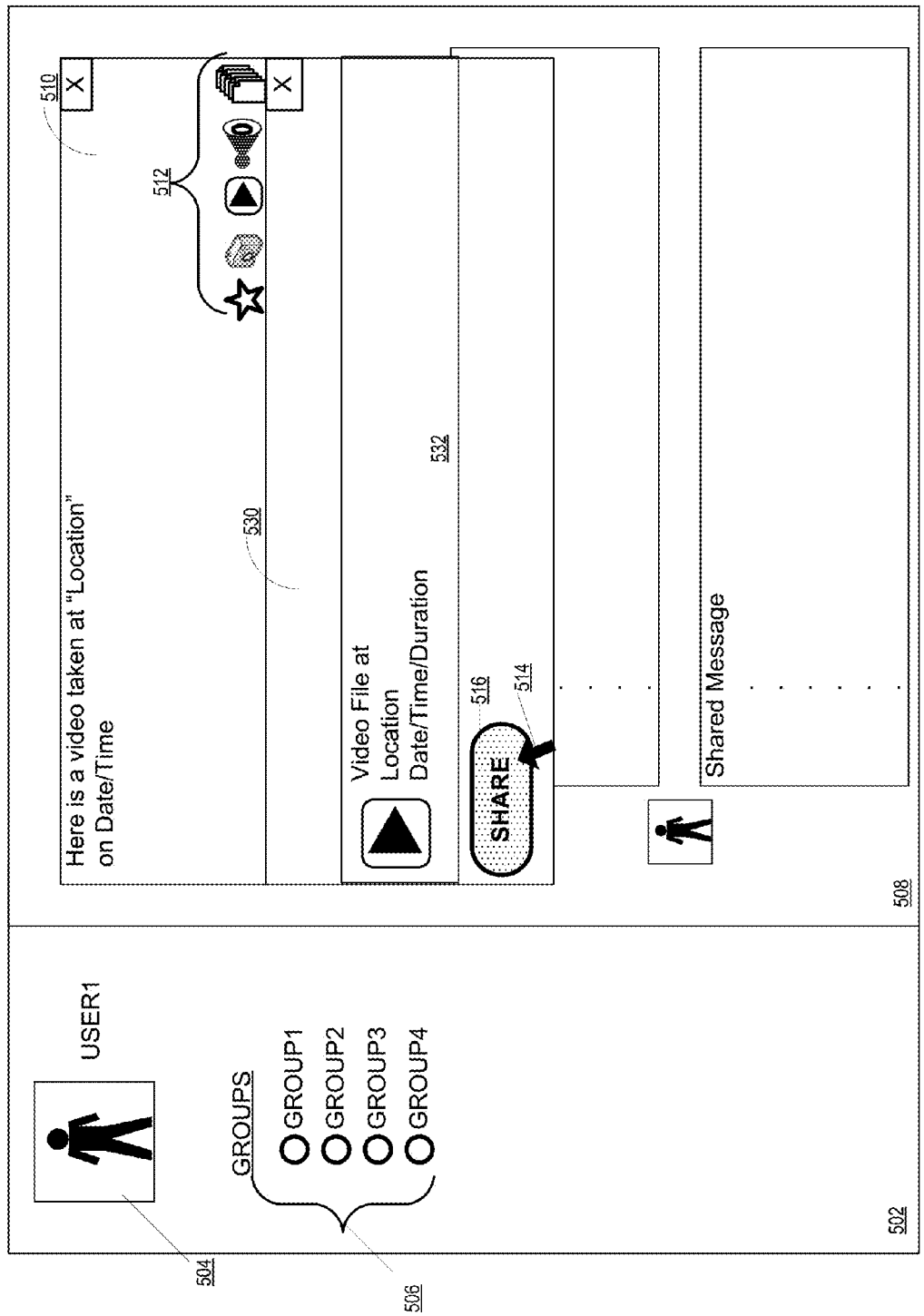

FIG. 5A-5C illustrate a client interface to a social networking service enabled to access captured media data according to an embodiment of the invention. In this embodiment, as shown in FIG. 5A, client interface 500 provides an online social network representation of a user (i.e., a profile), his/her social links, and a variety of services, including means for users to interact over the internet, such as messaging. Client interface includes user window pane 502, which identifies the current user 504 (i.e., 'USER1') and the user's 'GROUPS' 506, which include sets of other users of the social networking service dividing into different groups (i.e., GROUP1-GROUP4). Said groups may each have different sharing privileges, wherein some groups have access to a greater amount of content available from the profile of USER1 compared to other groups (e.g., groups may be divided by family, friends, co-workers, acquaintances, etc.).

Client interface 500 further includes window pane 508 to allow USER1 to share ideas, activities, events, and interests within his/her individual networks. In this example, window pane 508 displays messages shared between users of the social network. For example, shared message 518 was sent by USER2 to USER1 and shared message 520 was sent by USER3 to USER1.

Input box 510 accepts user commands to share (via SHARE icon 516) content with other members of the social network. For example, input box 510 may accept user text input to share a message with other users. Input box 501 may also be utilized to share media data with other users. Icons 512 may select a type of file to share (i.e., image, video, audio, etc.). In this embodiment, the 'star' icon is used to access media data related to USER1's history of real-world experiences, while the remaining icons are used to access media data that are not necessarily related to USER1's history of real-world experiences.

As can been seen in FIG. 5B, after cursor 514 is manipulated by USER1 to select the star icon to access media data related to his/her history of real-world experiences, window 530 appears below input box 510 to display the relevant media data. In this example, video file 532 is shown to have been captured by the user, and has been processed to identify the location of where the video was captured, the date and time of the capture, and the duration of the video. Furthermore, as described above, video file 532 has been processed to determine its relevancy to USER1's known history of real-world experiences. In this example, object 534 was identified from video file 532, and USER4 534 (who is included in GROUP1) is shown to have been identified from the video file as well. In some embodiments of the invention, the media data presented to the user is a subset of the user's history of real-world experiences, narrowed down by the aspects of the current use of client interface 500. For example, said subset of the user's history of real-world experiences may be filtered to include recently captured media data, data captured at locations proximate to the user's current location (if known), recent social networking interactions (e.g., data relevant to messages 518 and 520), text entered by the user in text box 510 (as discussed in further detail below), etc.

As can been seen in FIG. 5C, after cursor 514 is manipulated by USER1 to select video file 532 to be shared, is appears as "attached" to input box 510. In this embodiment, text is automatically inserted into input box 510 to describe the captured media data that is to be shared. In this example, the text that is automatically inserted into input box 510 describes the location and time related to video file 532, allowing the user to efficiently share the context of the real-world experience related to the video file; this text may be edited by USER1 so that video file 532 is accompanied by a different message. In this example, object 534 and USER4 536 are shown as not identified, as USER1 did not select the option to identify them.

Figure 6A:
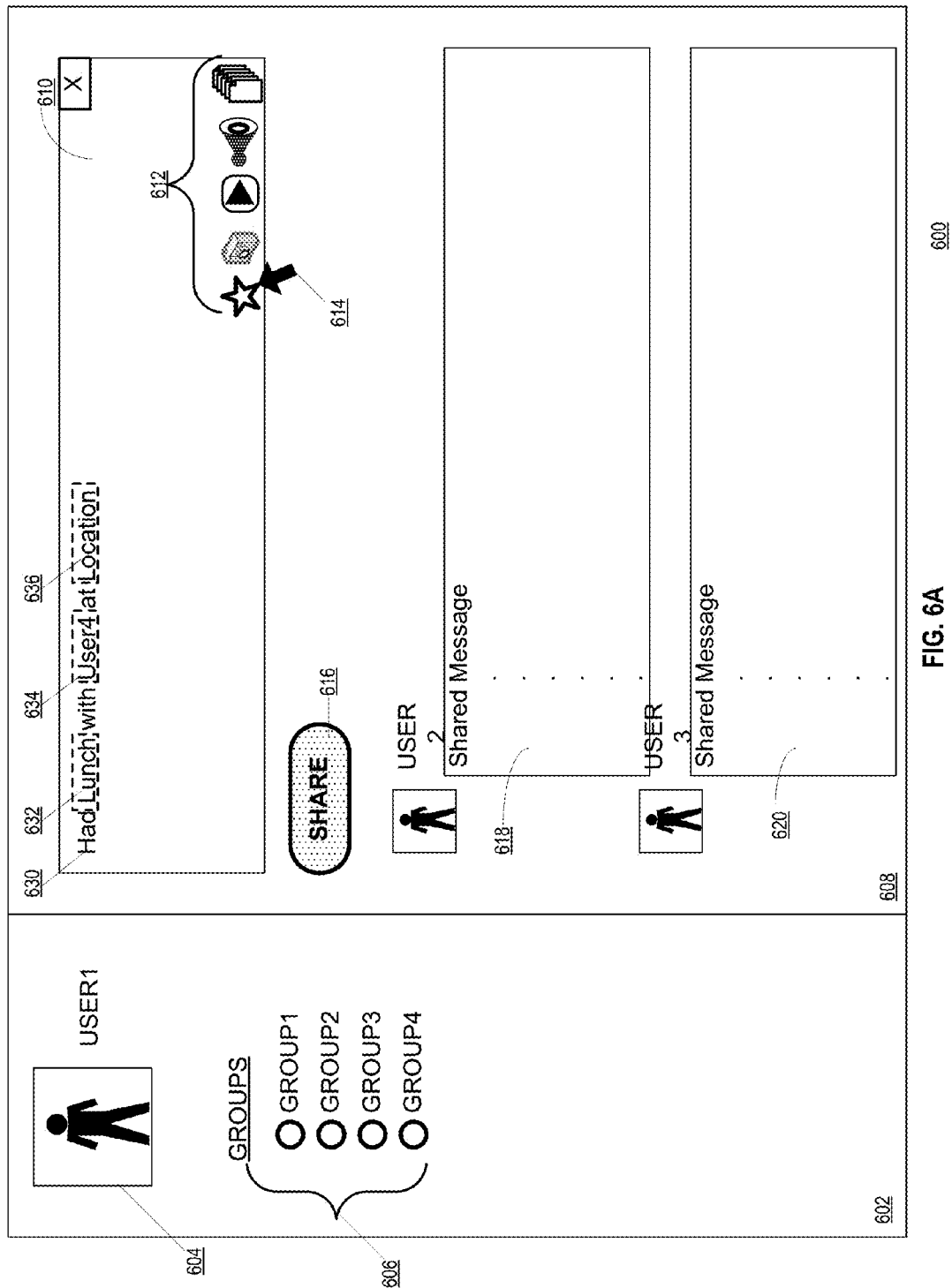
FIG. 6A-6B illustrate a client interface to a social networking service to proactively search for relevant captured media data according to an embodiment of the invention.
Figure 6B:
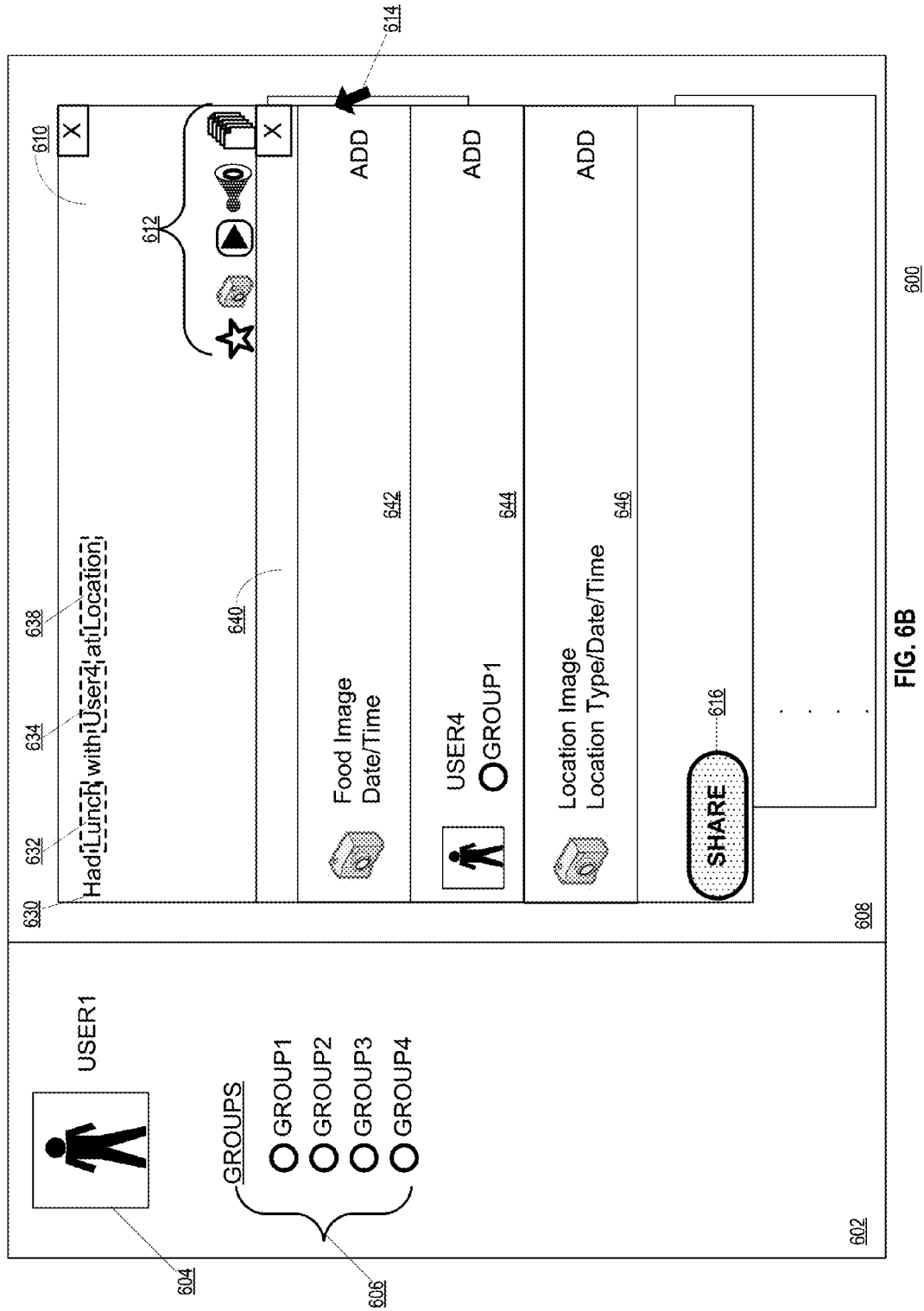

FIG. 6A-6B illustrate a client interface to a social networking service to proactively search for relevant captured media data according to an embodiment of the invention. In this embodiment, as shown in FIG. 6A, client interface 600 is shown to be similar to interface 500 of FIG. 5A, and includes user window pane 602, which identifies the current user 604 (i.e., 'USER1') and the user's 'GROUPS' 604, which include sets of other users of the social networking service dividing into different groups (i.e., GROUP1-GROUP4) having different sharing privileges, and window pane 608 to allow USER1 to share ideas, activities, events, and interests within his/her individual networks. Window pane 608 displays messages shared between users of the social network. For example, shared message 618 was sent by USER2 and shared message 620 was sent by USER3.

Input box 610 accepts user commands to share (via SHARE icon 616) content of the social network. In this example, USER1 has input the string "Had Lunch with User4 at Location" into input box 610. Upon selecting the 'star' icon from icons 612 via cursor 614, embodiments of the invention parse said string for keywords and convert it into a search for related media data included in USER1's history of real-world experiences. In this example, keyword 632 ('lunch') is interpreted as a search for image or video data related to food at around the typical hours for lunch, keyword 634 ('User4') is interpreted as a search for whether USER4 is included in USER1's social network of contacts, and keyword 636 ('Location') is interpreted as a search for an image or video data identifying said location. It is understood that different and more complex searches may be performed based on said string—e.g., image or video data related to food that is associated with both a time stamp around the typical hours of lunch and said location may be searched and displayed, if any exist.

In this example, as shown in FIG. 6B, food image data 642, contact for USER4 644 and location image 646 are displayed in window pane 640 as being items in USER1's history of real-world experience that are related to string 630. USER1 may select any or all of items 642, 644 and 646 be displayed with message 630 when it is shared with other users of the social network. Furthermore, in this example, USER4 is shown to be included in GROUP1, and said shared message/media data may be shared consistent with the sharing preferences assigned to GROUP1.

Figure 7:
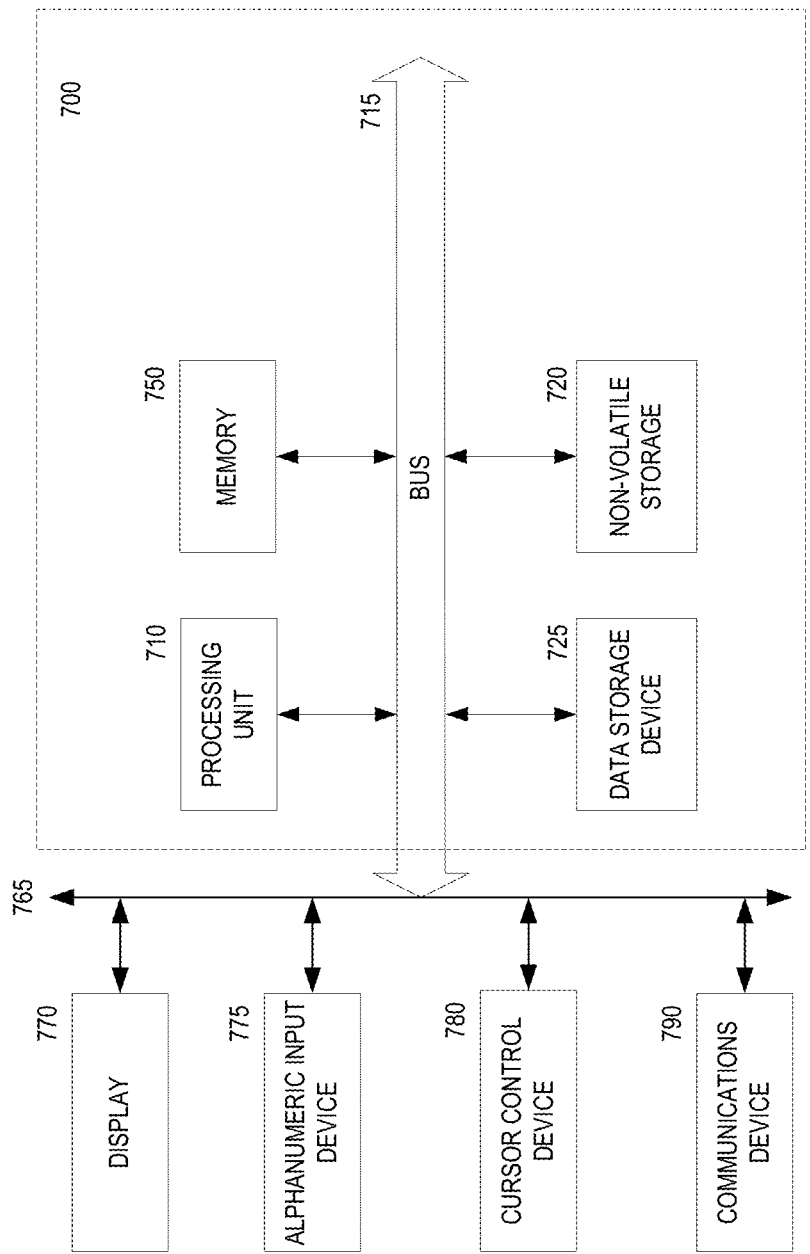
FIG. 7 is an illustration of a server computing device to transmit a list of captured media data via a social media client interface according to an embodiment of the invention.

FIG. 7 is an illustration of a server computing device to transmit a list of captured media data via a social media client interface according to an embodiment of the invention. The data processing system illustrated includes bus or other internal communication means 715 for communicating information, and processor 710 coupled to bus 715 for processing information. The system further comprises random access memory (RAM) or other volatile storage device 750 (alternatively referred to herein as main memory), coupled to bus 715 for storing information and instructions to be executed by processor 710. Main memory 750 also may be used for storing temporary variables or other intermediate information during execution of instructions by processor 710. The system also comprises read only memory (ROM) and/or static storage device 720 coupled to bus 715 for storing static information and instructions for processor 710, and data storage device 725 such as a magnetic disk or optical disk and its corresponding disk drive. Data storage device 725 is coupled to bus 715 for storing information and instructions.

The system may further be coupled to display device 770, such as a cathode ray tube (CRT) or a liquid crystal display (LCD) coupled to bus 715 through bus 765 for displaying information to a computer user. Alphanumeric input device 775, including alphanumeric and other keys, may also be coupled to bus 715 through bus 765 for communicating information and command selections to processor 710. An additional user input device is cursor control device 780, such as a mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network in order to transmit a list of captured media data via a social media client interface as described above. Communication device 790 may include any of a number of commercially available networking peripheral devices such as those used for coupling to an Ethernet, token ring, Internet, or wide area network. Communication device 790 may further be a null-modem connection, or any other mechanism that provides connectivity between computer system 700 and the outside world. Note that any or all of the components of this system illustrated in FIG. 7 and associated hardware may be used in various embodiments of the invention.

It will be appreciated by those of ordinary skill in the art that any configuration of the system may be used for various purposes according to the particular implementation. The control logic or software implementing embodiments of the invention can be stored in main memory 750, mass storage device 725, or other storage medium locally or remotely accessible to processor 710.

It will be apparent to those of ordinary skill in the art that the system, method, and process described herein can be implemented as software stored in main memory 750 or read only memory 720 and executed by processor 710. This control logic or software may also be resident on an article of manufacture comprising a computer readable medium having computer readable program code embodied therein and being readable the mass storage device 725 and for causing processor 710 to operate in accordance with the methods and teachings herein.

FIG. 8 illustrates an example computer network infrastructure for transmitting information for providing a social media client interface according to an embodiment of the invention. In system 836, device 838 communicates using communication link 840 (e.g., a wired or wireless connection) to remote device 842. Device 838 may be any type of device that can receive data to provide an interface for a user to share one or more of the media data files in a social network, as described above, and display information corresponding to or associated with the data.

Device 838 includes display system 844 comprising processor 846 and display 848. Display 848 may be, for example, an optical see-through display, an optical see-around display, or a video see-through display. Processor 846 may receive data from remote device 842, and configure the data for display. Processor 846 may be any type of processor, such as a micro-processor or a digital signal processor, for example.

Device 838 may further include on-board data storage, such as memory 850 coupled to processor 846. Memory 850 may store software that can be accessed and executed by processor 846, for example.

Remote device 842 may be any type of computing device or transmitter including a laptop computer, a mobile telephone, etc., that is configured to transmit data to device 838. Remote device 842 and device 838 may contain hardware to enable communication link 840, such as processors, transmitters, receivers, antennas, etc.

Communication link 840 is illustrated as a wireless connection; however, wired connections may also be used. For example, communication link 840 may be a wired link via a serial bus such as a universal serial bus or a parallel bus. A wired connection may be a proprietary connection as well. Communication link 840 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Remote device 842 may be accessible via the Internet and may comprise a computing cluster associated with a particular web service (e.g., social-networking, photo sharing, address book, etc.).

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent series of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion above, it is appreciated that throughout the description, discussions utilizing terms such as "capturing," "transmitting," "receiving," "parsing," "forming," "monitoring," "initiating," "performing," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the method operations. The required structure for a variety of these systems will appear from the description above. In addition, the embodiments of the invention are not described with reference to any particular programming language. It will be appreciated that a variety of programming languages may be used to implement the teachings of the invention as described herein.

The present description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

The invention claimed is:

1. A method comprising:
   receiving a list of one or more media data files, wherein the list includes, for each of the one or more media data files, respective data identifying one or more real-world experiences of a user of a social network associated with the media data file, the social network comprising a plurality of users and a networking service to track and enable connections between the users; and
   transmitting information, based on the list, to represent as a first search result in an interface provided via a mobile computing device, wherein the interface comprises an input box to receive content that is to be included in a post to be shared with users of the social network, the interface further comprising a first graphical user interface (GUI) element, wherein a selection of the first GUI element is to limit a first search request to media files that each represent respective content that is associated with a real-world experience of the user, wherein the first search result comprises one or more items each identifying a respective media data file and a corresponding real-world experience, wherein a selection of a first item of the one or more items from the first search result via the interface is to choose a respective media data file to be included in the post.

2. The method of claim 1, wherein each of the one or more media data files includes one or more of digital image data and digital audio data.

3. The method of claim 1, wherein the list of one or more media data files identifies a plurality of media data files, and wherein the first search result includes only a subset of the plurality of media data files.

4. The method of claim 3, wherein the list of one or more media data files includes, for each of the one or more media data files, a respective time value identifying when the media data file was captured, and wherein the first search result is based at least in part on the time values of the one or more media data files.

5. The method of claim 3, wherein the list of one or more media data files includes, for each of the one or more media data files, respective location data identifying a location where the respective media data file was captured, and wherein the first search result is based at least in part on the location data of the one or more media data files.

6. The method of claim 3, wherein the content includes a string of a message, and wherein the first search result is based at least in part on the string.

7. The method of 6, wherein the interface is accessible via a second GUI element presented within the networking service module to accept user text input to share a message with one or more other users of the social network.

8. The method of claim 1, wherein the list of one or more media data files includes media data associated with a second user of the social network, and wherein the first search result identifies the second user of the social network.

9. A non-transitory computer readable storage medium including instructions that, when executed by a processor, cause the processor to perform a method comprising:
   receiving a list of one or more media data files, wherein the list includes, for each of the one or more media data files, respective data identifying one or more real-world experiences of a user of a social network associated with the media data file, the social network comprising a plurality of users and a networking service to track and enable connections between the users; and
   transmitting information, based on the list, to represent as a first search result in an interface provided via a mobile computing device, wherein the interface comprises an input box to receive content that is tobe included in apost to be shared with users of the social network, the interface further comprising a first graphical user interface (GUI) element, wherein a selection of the first GUI element is to limit a first search request to media files that each represent respective content that is associated with a real-world experience of the user, wherein the first search result comprises one or more items each identifying a respective media data file and a corresponding real-world experience, wherein a selection of a first item of the one or more items from the first search result via the interface is to choose a respective media data file to be included in the post.

10. The non-transitory computer readable storage medium of claim 9, wherein each of the one or more media data files includes one or more of digital image data and digital audio data.

11. The non-transitory computer readable storage medium of claim 9, wherein the list of one or more media data file identifies a plurality of media data files, and wherein the first search result includes only a subset of the plurality of media data files.

12. The non-transitory computer readable storage medium of claim 11, wherein the list of one or more media data files further includes, for each of the one or more media data files, a respective time value identifying when the media data file was captured, and wherein the first search result is based at least in part on the time values of the one or more media data files.

13. The non-transitory computer readable storage medium of claim 11, wherein the list of one or more media data files includes, for each of the one or more media data files, respective location data identifying a location where the respective media data file was captured, and wherein the first search result is based at least in part on the location data of the one or more media data files.

14. The non-transitory computer readable storage medium of claim 11, wherein the content includes a string of a message, and wherein the first search result is based at least in part on the string.

15. The non-transitory computer readable storage medium of 14, wherein the interface is accessible via a second GUI element presented within the networking service module to accept user text input to share a message with one or more other users of the social network.

16. The non-transitory computer readable storage medium of claim 9, wherein the list of one or more media data files includes media data associated with a second user of the social network, and wherein the first search result identifies the second user of the social network.

17. A server system comprising:
   a memory;
   a processor; and
   a social networking service module included and the memory and executed via a processor to:
   receive a first search request from a user of a social network, via a client device, wherein an interface provided via a client device comprises an input box to receive content that is to be included in a post to be shared with users of the social network, wherein the interface further comprises a first graphical user interface (GUI) element, wherein a selection of the first GUI element limits the first search request to media data files that each represent respective content that is associated with a real-world experience of the user;

retrieve, in response to the first search request, a list of one or more media data files each associated with a respective real-world experience of the user, the list to further include, for each of the media data files, respective data identifying a real-world experience of the user associated with the media data file; and transmit information based on the list, to represent as a first search result in the interface, wherein the first search result comprises one or more items each identifying a respective media data file and a corresponding real-world experience, wherein a selection of a first item of the one or more items from the first search result via the interface is to choose a respective media data file to be included in the post.

18. The server system of claim 17, wherein each of the one or more media data files includes one or more of digital image data and digital audio data.

19. The server system of claim 17, wherein the list identifies a plurality of media data files, and wherein the first search result includes only a subset of the plurality of media data files.

20. The server system of claim 19, wherein the list of one or more media data files further includes, for each of the one or more media data files, a respective time value identifying when the media data file was captured, and wherein the first search result is based at least in part on the time values of the one or more media data files.

21. The server system of claim 19, wherein the list of one or more media data files includes, for each of the one or more media data files, respective location data identifying a location where the media data file was captured, and wherein the first search result is based at least in part on the location data of the one or more media data files.

22. The server system of claim 19, wherein the content includes a string of a message, and wherein the first search result is based at least in part on the string.

23. The server system of claim 17, wherein the list of one or more media data files includes media data associated with a second user of the social network, and wherein the first search result identifies the second user of the social network.

24. The server system of claim 17, wherein the one or more media data files is included in the memory of the server system.

25. The server system of claim 17, wherein the one or more media data files is included in a media data server system, and the social networking service module to further:

request the list of one or more media data files associated with real-world experiences of the user from the media data server system.

\* \* \* \* \*